US011288261B2

(12) United States Patent
Gupta et al.

(10) Patent No.: US 11,288,261 B2
(45) Date of Patent: Mar. 29, 2022

(54) DATA INGESTION INTO A POLYSTORE

(71) Applicant: The Regents of the University of California, Oakland, CA (US)

(72) Inventors: Amarnath Gupta, San Diego, CA (US); Subhasis Dasgupta, San Diego, CA (US); Margaret Roberts, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 525 days.

(21) Appl. No.: 16/209,397

(22) Filed: Dec. 4, 2018

(65) Prior Publication Data
US 2019/0171632 A1 Jun. 6, 2019

Related U.S. Application Data

(60) Provisional application No. 62/594,408, filed on Dec. 4, 2017.

(51) Int. Cl.
*G06F 16/00* (2019.01)
*G06F 16/23* (2019.01)
*G06F 16/2453* (2019.01)

(52) U.S. Cl.
CPC .... *G06F 16/2379* (2019.01); *G06F 16/24542* (2019.01)

(58) Field of Classification Search
CPC ................................................ G06F 16/24542
See application file for complete search history.

(56) References Cited

U.S. PATENT DOCUMENTS

| 2003/0033179 | A1* | 2/2003 | Katz | G06Q 10/0631 |
| | | | | 705/7.12 |
| 2008/0092112 | A1* | 4/2008 | Jin | G06F 16/2433 |
| | | | | 717/106 |
| 2011/0047525 | A1* | 2/2011 | Castellanos | G06F 16/283 |
| | | | | 717/104 |

(Continued)

OTHER PUBLICATIONS

Bonaque, R. et al., "Mixed-instance querying: A lightweight integration architecture for data journalism," Proc. VLDB Endow., vol. 9, pp. 1513-1516, Sep. 2016.

(Continued)

*Primary Examiner* — Tyler J Torgrimson
(74) *Attorney, Agent, or Firm* — Mintz Levin Cohn Ferris Glovsky and Popeo, P.C.

(57) ABSTRACT

A method may include determining, based on a data analysis plan that includes analytical operations performed on at least a portion of the dataset being ingested into and/or stored in the polystore, an optimization for the ingestion of the dataset into the polystore. The ingestion of the dataset includes storing, in a first database management system and/or a second database management system in the polystore, the portion of the dataset. The analysis plan may be modified, based on the optimization, by adding, removing, and/or reordering one or more analytical operations included in the data analysis plan. During the ingestion of the dataset, the optimization may be applied by routing, based on the optimization, the portion of the dataset for storage at the first database management system and/or the second database management system. Related systems and articles of manufacture are also provided.

19 Claims, 5 Drawing Sheets

(56) References Cited

U.S. PATENT DOCUMENTS

2014/0297583 A1* 10/2014 Halasipuram ......... G06F 16/254
707/602

OTHER PUBLICATIONS

Dasgupta, S. et al., "Analytics-driven data ingestion and derivation in the AWESOME polystore," in Proc. of the IEEE Int. Conf. on Big Data, pp. 2555-2564, IEEE, Dec. 2016.
Gadepally, V. et al., "The BigDAWG polystore system and architecture," in 2016 IEEE High Performance Extreme Computing Conference (HPEC), pp. 1-6, Sep. 2016.
Halperin, D. et al., "Demonstration of the myria big data management service," in Proceedings of the 2014 ACM SIGMOD International Conference on Management of Data, SIGMOD '14, (New York, NY, USA), pp. 881-884, ACM, 2014.
Kolev, B. et al., "CloudMdsQL: querying heterogeneous cloud data stores with a common language," Distributed and Parallel Databases, vol. 34, pp. 463-503, Dec. 2016.

* cited by examiner

*Relational Data*
Tweets(TweetID, date, userID, text, entity:JSON, geo:JSON, place:JSON, retweetCount, . . .)
Users(ID, name, screenName, location, description, URL, createdAt, friendsCount, followerCount, . . .)
newsArticles(newsID, newsPaperID, date, section, title:text, content:text, author:list(string), . . .)
politicians(ID, name, party, role, termStart, termEnd, committees:list(string), . . .).
*Graph Data*
follows(follower:tweetUserID, followee:tweetUserID)
*Text Data*
The Solr Index over (newsArticles.newsID, newsArticles.date, newsArticles.content)

FIG. 2

```
v0 = select newsID, newsText, newsDate
     from newsDataTable T, politicalDictionary D
     where T.newsDate > date('2018/01/01') and
     DMatches(T.newsText, any(D.entityName),
              method='ngram', threshold=0.7);

v1 = termDocumentHistogram(v0.newsID, v0.newsText,
                           stopwordFile = 'myNewsStopwords');

v2 = topicModelGraph(v1.vocabulary, v1.TDmatrix,
                     topicCount=50, store = True);

v3 = nounPhrases(sentences(v0), language='en', maxLength=4);

v4 = namedEntities(v3.sentence.id, v3.nounphrase);

v5 = createEntityNetwork(v4, granularity=sentence, time-attribute = v0.newsDate,
                         store = True)

v6 = PageRank(v5.nodes, time-granularity=month, store-in-node = True)
```

FIG. 3

DATA INGESTION INTO A POLYSTORE

RELATED APPLICATION

This application claims priority to U.S. Provisional Application No. 62/594,408 entitled "GENERATING POLYSTORE INGESTION PLANS" and filed on Dec. 4, 2017, the disclosure of which is incorporated herein by reference in its entirety.

STATEMENT OF GOVERNMENT SPONSORED SUPPORT

This invention was made with government support under SES1738411 awarded by the National Science Foundation. The government has certain rights in the invention.

TECHNICAL FIELD

The subject matter described herein relates generally to database management system processing and more specifically to the ingestion of data into a polystore with multiple database management systems.

BACKGROUND

A database management system (DBMS) may be configured to store a plurality of electronic data records. Data stored in the database management system may be organized into one or more database management system objects. For example, a relational database management system may store data in one or more tables. The relationships between different tables may be representative of the relationships that exists amongst the data stored in the relational database management system. By contrast, a non-relational database management system may store data as aggregates of documents, columns, key-value pairs, and/or graphs. To provide access to the data stored in the database management system, the database management system may be configured to support a variety of database management system operations for accessing the data records stored in the database management system. For example, the database management system may support structured query language (SQL) statements and/or an application programing interface (API) that includes a web-enabled application programming interface such as, for example, a representational state transfer (RESTful) based application programming interface, a simple object access protocol (SOAP) based application programming interface, and/or the like.

SUMMARY

Systems, methods, and articles of manufacture, including computer program products, are provided for ingesting data into a polystore. In one aspect, there is provided a system. The system may include at least one data processor and at least one memory. The at least one memory may store instructions that result in operations when executed by the at least one data processor. The operations may include: determining, based at least on a data analysis plan, at least one optimization for an ingestion of a dataset into a polystore that includes a first database management system and a second database management system, the data analysis plan including one or more analytical operations performed on at least a portion of the dataset being ingested into and/or stored in the polystore, and the ingestion of the dataset into the polystore including storing, in the first database management system and/or the second database management system, at least the portion of the dataset; modifying, based on the at least one optimization determined for the ingestion of the dataset into the polystore, the data analysis plan, the data analysis plan being modified by at least adding, removing, and/or reordering the one or more analytical operations included in the data analysis plan; and applying, during the ingestion of dataset into the polystore, the at least one optimization, the at least one optimization by at least routing, based on the at least one optimization, at least the portion of the dataset for storage at the first database management system and/or the second database management system.

In some variations, one or more features disclosed herein including the following features may optionally be included in any feasible combination. At least the portion of the dataset may be processed to conform to a constraint associated with the first database management system and/or the second database management system. The processing may include combining or partitioning chunks of data from the dataset in response to the chunks of data failing to meet the size constraint and/or a quantity constraint associated with the first database management system and/or the second database management system. The processing may include buffering at least the portion of the dataset in response to the portion of the dataset being output from one or more data sources at a rate that exceeds an ingestion rate of the first database management system and/or the second database management system.

In some variations, the at least one optimization may include storing at least the portion of the dataset at the first database management system and not the second database management system.

In some variations, the at least one optimization may include precomputing, based on at least the portion of the dataset, derived data. The at least one optimization may further include storing the derived data at the first database management system and/or the second database management system. The derived data may be generated by performing a first analytical operation in the data analysis plan. The data analysis plan may be modified by at least removing, from the data analysis plan, the first analytical operation. The data analysis plan may be further modified by at least adding, to the data analysis plan, a second analytical operation to retrieve, from the first database management system and/or the second database management system, at least a portion of the derived data.

In some variations, the at least one optimization may be determined based on a data model associated with the first database management system and/or the second database management system. The data model may include relational data, text data, graph data, and/or time series data. The at least on optimization may include storing at least the portion of the dataset in the first database management system and/or the second database management system based at least on the portion of the dataset having a same data model as the first database management system and/or the second database management system.

In some variations, the at least one optimization may be determined based at least on a rate at which the first database management system and/or the second database management system is able to ingest the dataset.

In some variations, the at least one optimization may be determined based at least on the first database management system and/or the second database management system supporting a first analytical operation but not a second analytical operation in the data analysis plan.

In some variations, the at least one optimization may be determined based at least on a resource that is available at the first database management system and/or the second database management system for performing the one or more analytical operations in the data analysis plan.

In some variations, the data analysis plan may be a directed acyclic graph (DAG) having a first node corresponding to the first database management system and a second node corresponding to the second database management system. The directed acyclic graph may further include at least one directed edge indicating a flow of data between the first database management system and the second database management system.

In another aspect, there is provided a method for ingesting data into a polystore. The method may include: determining, based at least on a data analysis plan, at least one optimization for an ingestion of a dataset into a polystore that includes a first database management system and a second database management system, the data analysis plan including one or more analytical operations performed on at least a portion of the dataset being ingested into and/or stored in the polystore, and the ingestion of the dataset into the polystore including storing, in the first database management system and/or the second database management system, at least the portion of the dataset; modifying, based on the at least one optimization determined for the ingestion of the dataset into the polystore, the data analysis plan, the data analysis plan being modified by at least adding, removing, and/or reordering the one or more analytical operations included in the data analysis plan; and applying, during the ingestion of dataset into the polystore, the at least one optimization, the at least one optimization by at least routing, based on the at least one optimization, at least the portion of the dataset for storage at the first database management system and/or the second database management system.

In some variations, one or more features disclosed herein including the following features may optionally be included in any feasible combination. The method may further include processing at least the portion of the dataset to conform to a constraint associated with the first database management system and/or the second database management system. The processing may include combining or partitioning chunks of data from the dataset in response to the chunks of data failing to meet the size constraint and/or a quantity constraint associated with the first database management system and/or the second database management system. The processing may include buffering at least the portion of the dataset in response to the portion of the dataset being output from one or more data sources at a rate that exceeds an ingestion rate of the first database management system and/or the second database management system.

In some variations, the at least one optimization may include storing at least the portion of the dataset at the first database management system and not the second database management system.

In some variations, the at least one optimization may include precomputing, based on at least the portion of the dataset, derived data. The at least one optimization may further include storing the derived data at the first database management system and/or the second database management system. The derived data may be generated by performing a first analytical operation in the data analysis plan. The data analysis plan may be modified by at least removing, from the data analysis plan, the first analytical operation. The data analysis plan may be further modified by at least adding, to the data analysis plan, a second analytical operation to retrieve, from the first database management system and/or the second database management system, at least a portion of the derived data.

In some variations, the at least one optimization may be determined based on a data model associated with the first database management system and/or the second database management system. The data model may include relational data, text data, graph data, and/or time series data. The at least on optimization may include storing at least the portion of the dataset in the first database management system and/or the second database management system based at least on the portion of the dataset having a same data model as the first database management system and/or the second database management system.

In some variations, the at least one optimization may be determined based at least on a rate at which the first database management system and/or the second database management system is able to ingest the dataset.

In some variations, the at least one optimization may be determined based at least on the first database management system and/or the second database management system supporting a first analytical operation but not a second analytical operation in the data analysis plan.

In some variations, the at least one optimization may be determined based at least on a resource that is available at the first database management system and/or the second database management system for performing the one or more analytical operations in the data analysis plan.

In some variations, the data analysis plan may be a directed acyclic graph (DAG) having a first node corresponding to the first database management system and a second node corresponding to the second database management system. The directed acyclic graph may further include at least one directed edge indicating a flow of data between the first database management system and the second database management system.

In another aspect, there is provided a computer program product that includes a non-transitory computer readable storage medium. The non-transitory computer-readable storage medium may include program code that causes operations when executed by at least one data processor. The operations may include: determining, based at least on a data analysis plan, at least one optimization for an ingestion of a dataset into a polystore that includes a first database management system and a second database management system, the data analysis plan including one or more analytical operations performed on at least a portion of the dataset being ingested into and/or stored in the polystore, and the ingestion of the dataset into the polystore including storing, in the first database management system and/or the second database management system, at least the portion of the dataset; modifying, based on the at least one optimization determined for the ingestion of the dataset into the polystore, the data analysis plan, the data analysis plan being modified by at least adding, removing, and/or reordering the one or more analytical operations included in the data analysis plan; and applying, during the ingestion of dataset into the polystore, the at least one optimization, the at least one optimization by at least routing, based on the at least one optimization, at least the portion of the dataset for storage at the first database management system and/or the second database management system.

In another aspect, there is provided an apparatus for optimizing the ingestion of data into a polystore. The apparatus may include: means for determining, based at least on a data analysis plan, at least one optimization for an ingestion of a dataset into a polystore that includes a first database management system and a second database management system, the data analysis plan including one or more analytical operations performed on at least a portion of the dataset being ingested into and/or stored in the polystore, and the ingestion of the dataset into the polystore including storing, in the first database management system and/or the second database management system, at least the portion of the dataset; means for modifying, based on the at least one optimization determined for the ingestion of the dataset into the polystore, the data analysis plan, the data analysis plan being modified by at least adding, removing, and/or reordering the one or more analytical operations included in the data analysis plan; and means for applying, during the ingestion of dataset into the polystore, the at least one optimization, the at least one optimization by at least routing, based on the at least one optimization, at least the portion of the dataset for storage at the first database management system and/or the second database management system.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to the ingestion of data into a polystore, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 2 depicts an example of a heterogeneous dataset, in accordance with some example embodiments;

FIG. 3 depicts an example of a data analysis plan written in a suitable dataflow language, in accordance with some example embodiments;

When practical, similar reference numbers denote similar structures, features, or elements.

DETAILED DESCRIPTION

Figure 1:
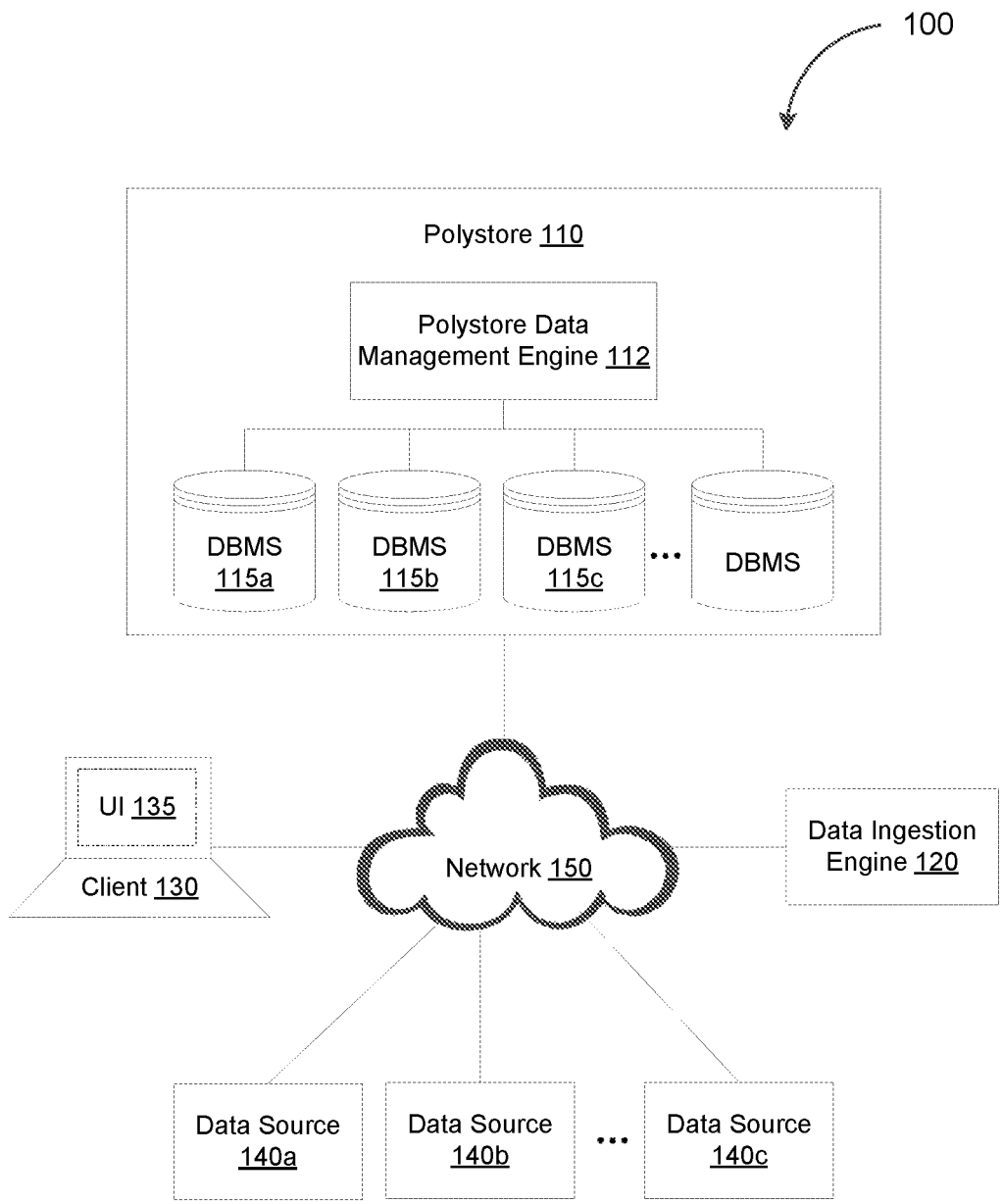
FIG. 1 depicts a system diagram illustrating a polystore system, in accordance with some example embodiments.

A polystore may refer to a data management system storing data in a collection of distinct database management systems. The polystore may be configured to support, for example, the retrieval and analysis of largescale complex, heterogeneous datasets. Each database management system in the polystore may be associated with a different data model including, for example, relational data, text data, graph data, time series data, and/or the like. Moreover, each database management system in the polystore may impose certain constraints in resources, capabilities, and/or the like. For example, some database management systems in the polystore may support data operations (e.g., similarity join over text data) that other database management systems in the polystore do not. Alternatively and/or additionally, some database management systems in the polystore may be able to accept streaming data at a different data rate than other database management systems in the polystore. As such, a naïve approach to ingesting data into the polystore may result in a less than optimal distribution of data across the different database management systems in the polystore. In particular, the data may be distributed in a manner that compromises the speed and/or efficiency of the subsequent retrieval, transfer, and/or manipulation of the ingested data.

Accordingly, in some example embodiments, the polystore may be coupled with a data ingestion engine configured to optimize the ingestion of data into the polystore based on a data analysis plan, specified in a dataflow language, enumerating the analytical operations to perform on the ingested data. For example, the data ingestion engine may optimize the ingestion of data by at least identifying one or more database management systems in the polystore for storing the ingested data. The data ingestion engine may further optimize the ingestion of data by processing the ingested data to conform to the constraints imposed by the database management systems in the polystore to which the ingested data are being stored. Alternatively and/or additionally, the ingestion of data into the polystore may be optimized by at least precomputing and storing, in one or more database management systems in the polystore, at least a portion of the derived data required by the data analysis plan. In doing so, the ingested data may be stored in a manner that maximizes the speed and/or efficiency of the retrieval, transfer, and/or manipulation of the ingested data. Moreover, the data ingestion engine may modify the data analysis plan, for example, by adding, removing, and/or reordering one or more analytical operations in the data analysis plan, to further exploit the optimizations applied to the ingestion of the data into the polystore.

In some example embodiments, the ingestion of data into the polystore may be optimized, for example, to minimize a total quantity of time required to ingest the data into the polystore. The total quantity of time required to ingest the data into the polystore may be minimized based on the corresponding analysis plan. Moreover, the extent to which the quantity of time required to ingest the data into the polystore may be minimized may be dependent on a variety of constraints including, for example, the ingestion capabilities of underlying database management systems, the query/analysis capabilities of the underlying database management systems, the nature of the analytical operations in the data analysis plan, data transportation cost, and/or the like.

Since the ingestion process may take place before any data is stored in the polystore, the data ingestion engine may lack at least some of the data statistics required to optimize the ingestion of data into the polystore. Accordingly, in some example embodiments, the data ingestion engine may perform one or more benchmarking tasks to determine at least some statistical characteristics of the data being ingested into the polystore including, for example, a minimum, maximum, median, and/or standard deviation of the data rate, volume, and/or data complexity (e.g., the quantity of nesting levels of semi-structured data, degree distribution of a graph, and/or the like) for each source of the data being ingested into the polystore. These benchmarking tasks may be performed independently of the data analysis plan. Moreover, the data ingestion engine may store the result of the benchmarking tasks in a data catalog associated with the data ingestion engine 120.

Unlike a query planning process, where the goal is to maximize the efficiency of executing the query, the data ingestion engine may use an ingestion plan as a prototype of the analysis. In optimizing the ingestion of data into the polystore, the data ingestion engine may first create a more generic version of the data analysis plan, for example, by parameterizing all constants and replacing constraints with variables as well as replacing more specific operations (e.g., an equality operation) with more generic operations (e.g., a range operation) for numeric comparisons or similarity comparisons for string comparisons. Based on the ingestion optimization strategy for the generalized analysis plan, the data ingestion engine may then generate a more specific version of the data analysis plan.

FIG. 1 depicts a system diagram illustrating a polystore data management system 100, in accordance with some example embodiments. Referring to FIG. 1, the polystore data management system 100 may include a polystore 110, a data ingestion engine 120, and a client 130. The polystore data management system 100 may further include one or more data sources including, for example, a first data source 140a, a second data source 140b, a third data source 140c, and/or the like. As shown in FIG. 1, the polystore 110, the data ingestion engine 120, the client 130, the first data source 140a, the second data source 140b, and/or the third data source 140c may be coupled via a network 150. The network 150 may be any wired and/or wireless network including, for example, a local area network (LAN), a virtual local area network (VLAN), a wide area network (WAN), a public land mobile network (PLMN), the Internet, and/or the like. Moreover, FIG. 1 shows the polystore 110 as including a plurality of database management systems including, for example, a first database management system 115a, a second database management system 115b, a third database management system 115c, and/or the like. The first database management system 115a, the second database management system 115b, and the third database management system 115c may be any type of database management system including, for example, an in-memory database management system, a relational database management system, a non-SQL (NoSQL) database management system, and/or the like.

One or more of the plurality of database management systems in the polystore 110 may be distinct database management systems having, for example, a different data model than other database management systems in the polystore. For example, the first database management system 115a may a relational database management system storing relational data, the second database management system 115b may be a graph database management system storing graph data, and the third database management system 115c may be a document-oriented database management system storing text data. However, it should be appreciated that the first database management system 115a, the second database management system 115b, and the third database management system 115c may be associated with any data model. Moreover, at least one of the first database management system 115a, the second database management system 115b, and the third database management system 115c may be a multi-model database management system that supports multiple data models.

Referring again to FIG. 1, the polystore 110 may include a polystore data management engine 112. The polystore data management engine 112 may be configured to coordinate the transfer of data between the first database management system 115a, the second database management system 115b, and/or the third database management system 115c. The polystore data management engine 112 may transform the data being transferred between the first database management system 115a, the second database management system 115b, and/or the third database management system 115c. For example, the polystore data management engine 112 may transform the data by performing operations to combine partial results from the first database management system 115a, the second database management system 115b, and/or the third database management system 115c. Alternatively and/or additionally, the polystore data management engine 112 may also restructure data before the data is returned, for example, to the client 130.

In some example embodiments, the plurality of database management systems in the polystore 110 may be associated with different constraints. For example, the first database management system 115a, the second database management system 115b, and/or the third database management system 115c may be capable of ingesting, at different rates, data originating from the first data source 140a, the second data source 140b, and/or the third data source 140c. Moreover, the first database management system 115a, the second database management system 115b, and the third database management system 115c may each be configured to ingest a threshold quantity and/or a threshold size of data. Alternatively and/or additionally, the first database management system 115a, the second database management system 115b, and/or the third database management system 115c may observe different preferences for ingestion operations such as, for example, merge, create, and/or the like. For instance, the first database management system 115a, the second database management system 115b, and/or the third database management system 115c may support only non-chain ingestion operations. The first database management system 115a, the second database management system 115b, and/or the third database management system 115c may also be more optimized for some ingestion operations such that some ingestions operations may be performed faster and/or more efficiently than other ingestion operations. For example, performing a "graph merge" operation on incoming data using data already stored in a graph database may be an expensive computation. Alternatively and/or additionally, a graph-based database management system may not permit direct ingestion of an incoming graph fragment if the topology of the graph fragment is excessively complex. In this scenario, the incoming graph may require decomposition into a plurality of fragments having comparatively simpler topographies such that the incoming graph may be ingested into the graph-based database management system in fragments.

Each of the first database management system 115a, the second database management system 115b, and/or the third database management system 115c may each be associated with one or more resource constraints including, for example, limitations in memory, processors, maximum number of threads, timeout parameters, and/or the like. Alternatively and/or additionally, the first database management system 115a, the second database management system 115b, and/or the third database management system 115c may support and/or be optimized for different analytical operations such as, for example, select, match, merge, view, and/or the like. For example, the first database management system 115a, the second database management system 115b, and the third database management system 115c may each support some but not all analytical operations. Furthermore, the first database management system 115a, the second database management system 115b, and/or the third database management system 115c may be capable of performing some analytical operations faster and/or more efficiently than other analytical operations.

In some example embodiments, the data ingestion engine 120 may be configured to optimize the ingestion of data into the polystore 110 based at least on a data analysis plan describing the retrieval, transfer, and/or manipulation of data stored in the polystore 110. For example, the data ingestion engine 120 may determine one or more optimizations that may be applied to the ingestion of the data into the polystore 110. Furthermore, the data ingestion engine 120 may control the ingestion of the data into the polystore 110 including, for example, by applying the one or more optimizations during the ingestion of the data into the polystore 110. In order to ingest the data into the polystore 110, the data ingestion engine 120 may route, based at least I part on the one or more optimizations, at least a portion of the data for storage at the first database management system 115a, the second database management system 115b, and/or the third database management system 115c.

To further illustrate, FIG. 2 depicts an example of a heterogeneous dataset 200, in accordance with some example embodiments. The heterogeneous dataset 200 may originate from multiple data sources including, for example, the first data source 140a, the second data source 140b, and/or the third data source 140c. Accordingly, the heterogeneous dataset 200 may be a multi-model dataset that includes data having multiple data models including, as shown in FIG. 2, relational data, graph data, and text data. Meanwhile, FIG. 3 depicts an example of a data analysis plan 300, in accordance with some example embodiments. The analysis plan 300 may be a dataflow script enumerating, for example, one or more analytical operations that are performed on the heterogeneous dataset 200 once the heterogeneous dataset 200 is ingested into the polystore 110 for storage in the first database management system 115a, the second database management system 115b, and/or the third database management system 115c.

It should be appreciated that the data analysis plan 300 may be represented as a directed acyclic graph (DAG) having a plurality of nodes interconnected by one or more directed edges. For example, the nodes of the directed acyclic graph may correspond to the first database management system 115a, the second database management system 115b, and/or the third database management system 115c while the directed edges in the directed acyclic graph may correspond to the transfer of at least a portion of the heterogeneous dataset 200 and/or derived data generated based on the heterogeneous dataset 200 between the first database management system 115a, the second database management system 115b, and/or the third database management system 115c.

Referring to FIGS. 1-3, performing the analytical operations included in the data analysis plan 300 may require retrieving, transferring, and/or manipulating at least a portion of the heterogeneous dataset 200 stored at the first database management system 115a, the second database management system 115b, and/or the third database management system 115c. As noted, FIG. 2 shows the heterogeneous dataset 200 as including relational data, graph data, and text data. Moreover, the data analysis plan 300 shown in FIG. 3 indicates that performing the analytical operations included in the data analysis plan 300 may require retrieving, transferring, and/or manipulating the relational data stored in the first database management system 115a, the graph data stored in the second database management system 115b, and/or the text data stored in the third database management system 115c. Accordingly, the data ingestion engine 120 may optimize the ingestion of the heterogeneous dataset 200 into the polystore 110 such that the heterogeneous dataset 200 may be retrieved, transferred, and/or manipulated with maximum speed and/or efficiency.

In some example embodiments, the data ingestion engine 120 may optimize, based at least on the data analysis plan 300, the ingestion of the heterogeneous dataset 200 into the polystore 110. Furthermore, the data ingestion engine 120 may modify the data analysis plan 300 for example, by adding, removing, and/or reordering one or more analytical operations in the data analysis plan 300, to further exploit the optimizations applied to the ingestion of the heterogeneous dataset 200 into the polystore 110. The modified analysis plan 300 may be executed to generate a result that may be provided to the client 130, for example, via a user interface 135 at the client 130. For instance, the data ingestion engine 120 may optimize the ingestion of the heterogeneous dataset 200 into the polystore 110, for example, by at least identifying the first database management system 115a, the second database management system 115b, and/or the third database management system 115c for storing the heterogeneous dataset 200. The data ingestion engine 120 may process at least a portion of the heterogeneous dataset 200 to conform to the constraints imposed by the first database management system 115a, the second database management system 115b, and/or the third database management system 115c. Alternatively and/or additionally, the data ingestion engine 120 may optimize the ingestion of the heterogeneous dataset 200 into the polystore 110 by at least precomputing and storing, in the first database management system 115a, the second database management system 115b, and/or the third database management system 115c, at least a portion of the derived data required by the data analysis plan 300. As used herein, derived data may refer to any data that is generated by applying one or more operations to the heterogeneous dataset 200 and/or other derived data generated based on the heterogeneous dataset 200.

Referring again to FIGS. 2-3, the heterogeneous dataset 200 may include relational data, text data, and graph data. Meanwhile, the data analysis plan 300 may include one or more analytical operations. The one or more analytical operations may be performed on the heterogeneous dataset 200 to generate the result, which may be provided to the client 130 via the user interface 135 at the client 130. Moreover, performing the one or more analytical operations included in the data analysis plan 300 may require the retrieval, transfer, and/or manipulation of at least portions of the heterogeneous dataset 200 stored at the first database management system 115a, the second database management system 115b, and/or the third database management system 115c. For example, performing the one or more analytical operations included in the data analysis plan 300 may require a portion of the heterogeneous dataset 200 to be retrieved from the first database management system 115a and transferred to the second database management system 115b before being manipulated and/or stored to the third database management system 115c. Accordingly, the data ingestion engine 120 may also optimize the ingestion of the heterogeneous dataset 200 such that the retrieval, transfer, and/or manipulation of the heterogeneous dataset 200 may be performed with maximum speed and/or efficiency.

In some example embodiments, the data ingestion engine 120 may optimize the ingestion of the heterogeneous dataset 200 by at least selecting the first database management system 115a, the second database management system 115b, and/or the third database management system 115c for storing at least a portion of the heterogeneous dataset 200. That is, the data ingestion engine 120 may determine to store a first portion of the heterogeneous dataset 200 at the first database management system 115a, a second portion of the heterogeneous dataset 200 at the second database management system 115b, and/or a third portion of the heterogeneous dataset 200 at the third database management system 115c. For example, the data ingestion engine 120 may determine to store at least a portion of the heterogeneous dataset 200 in the first database management system 115a, the second database management system 115b, and/or the third database management system 115c based at least on the data models present in the heterogeneous dataset 200 and the data models supported by each of the first database management system 115a, the second database management system 115b, and/or the third database management system 115c. Accordingly, the data ingestion engine 120 may determine to store relational data from the heterogeneous dataset 200 in the first database management system 115a, graph data from the heterogeneous dataset 200 in the second database management system 115b, and text data from the heterogeneous dataset 200 in the third database management system 115c.

Alternatively and/or additionally, the data ingestion engine 120 may determine to store at least a portion of the heterogeneous dataset 200 in the first database management system 115a, the second database management system 115b, and/or the third database management system 115c based at least on the constraints associated with each of the first database management system 115a, the second database management system 115b, and/or the third database management system 115c. As noted, the data analysis plan 300 may include one or more analytical operations, which may be performed on at least a portion of the heterogeneous dataset 200 in order to generate, for example, the result that is provided to the client 130. Accordingly, the data ingestion engine 120 may determine to store at least the portion of the heterogeneous dataset 200 in the first database management system 115a, the second database management system 115b, and/or the third database management system 115c based at least on whether each of the first database management system 115a, the second database management system 115b, and/or the third database management system 115c supports and/or is optimized for the one or more analytical operations included in the data analysis plan 300. The data ingestion engine 120 may also determine to store the portion of the heterogeneous dataset 200 in the first database management system 115a, the second database management system 115b, and/or the third database management system 115c in order to maximize the speed and/or efficiency associated with performing the one or more analytical operations included in the data analysis plan 300.

In some example embodiments, the data ingestion engine 120 may further optimize the ingestion of the heterogeneous dataset 200 into the polystore 110 by at least processing at least a portion of the heterogeneous dataset 200 to conform to the constraints imposed by the first database management system 115a, the second database management system 115b, and/or the third database management system 115c. For example, the first database management system 115a, the second database management system 115b, and/or the third database management system 115c may be capable of ingesting the heterogeneous dataset 200 at limited rates. As such, the data ingestion engine 120 may be configured to buffer, during the ingestion of the heterogeneous dataset 200, at least a portion of the heterogeneous dataset 200 if the heterogeneous dataset 200 is being output from the first data source 140a, the second data source 140b, and/or the third data source 140c at a higher rate than the rate at which the first database management system 115a, the second database management system 115b, and/or the third database management system 115c are able to ingest the heterogeneous dataset 200.

Alternatively and/or additionally, the data ingestion engine 120 may process at least the portion of the heterogeneous dataset 200 to conform to a size constraint and/or a quantity constraint associated with the first database management system 115a, the second database management system 115b, and/or the third database management system 115c. For instance, the data ingestion engine 120 may combine and/or partition chunks of data that fail to meet the size constraint and/or the quantity constraint at the first database management system 115a, the second database management system 115b, and/or the third database management system 115c. In doing so, the data ingestion engine 120 may ensure that the heterogeneous dataset 200 may be successfully ingested into the polystore 110, for example, for storage at the first database management system 115a, the second database management system 115b, and/or the third database management system 115c.

In some example embodiments, the data ingestion engine 120 may modify the data analysis plan 300, for example, by adding, removing, and/or reordering one or more analytical operations in the data analysis plan 300, to exploit the optimizations applied to the ingestion of the heterogeneous dataset 200 into the polystore 110. The data ingestion engine 120 may also modify the data analysis plan 300 to eliminate bottlenecks and/or maximize parallelization. For example, when the data ingestion engine 120 determines to precompute at least a portion of the derived data required by the data analysis plan 300, the data ingestion engine 120 may also determine to remove, from the data analysis plan, the one or more analytical operations corresponding to the generation of the derived data. Since the data ingestion engine 120 may further determine to store the derived data in the first database management system 115a, the second database management system 115b, and/or the third database management system 115c, the data ingestion engine 120 may modify the data analysis plan 300, for example, by adding one or more analytical operations, to retrieve, transfer, and/or manipulate the derived data from the first database management system 115a, the second database management system 115b, and/or the third database management system 115c. The one or more analytical operations to retrieve, transfer, and/or manipulate the derived data may replace the one or more analytical operations to generate the derived data.

For example, consider a data analysis plan in which the data is passed through a first function f1 followed by a second function f2 before being stored in a data store S. To optimize the ingestion of the corresponding data into the polystore 110, the data ingestion engine 120 may determine, for example, whether the first function f1 and/or the second function f2 should be performed in memory. Alternatively and/or additionally, the data ingestion engine 120 may determine whether the result of first function f1 should be stored in one database management system such that the second function f2 may operate on the result of the first function f1 stored in the database management system (e.g., as a combination of a user-defined function and a query, assuming such a rewrite is available). The choice between the two strategies may depend on the nature of the second function f2. For example, if f2 is a blocking function, then the data volume estimated from the benchmarking process may exceed memory limits, thereby requiring the storage of the output from the second function f2. Even if the second function f2 is not a blocking function, the second function f2 may nevertheless require construction of an intermediate data structure before the second function f2 may be applied. Accordingly, the data ingestion engine 120 may determine that the construction of a data structure (e.g., an inverted index) may be most optimally performed by streaming output from the first function f1 into a database management system before retrieving the output to provide to the second function f2. The data ingestion engine 120 may further determine, based on a generalized analysis plan, that intermediate storage should persist for all future analysis plans following the same template. Similarly, performing the second function f2 as a user defined function inside a database management system may be much more efficient for large-scale data than computing the second function f2 in-memory. However, if the first function f1 and the second function f2 are both per-record operations and can be executed in a pipelined fashion, the data ingestion engine 120 may determine that it is more optimal to perform the two function in memory.

As another example, consider the ingestion of a data stream having a first data model D1 (e.g., relational data). The data stream may be filtered by a first function f1 before being cast into a second data model D2 (e.g., graph data) by a second function f2. The output may be stored in a data store S associated with the second data model D2. The data ingestion engine 120 may determine whether the first function f1 and the second function f2 may be performed in a pipelined fashion. Alternatively and/or additionally, the data ingestion engine 120 may determine whether the ingestion of data into the polystore 110 may be optimized by inserting a third function f3. The data ingestion engine 120 may determine an optimization strategy based on the rate at which the data store S is able to ingest data. For example, the benchmarking results may indicate that if the data rate of the stream exceeds a first rate R1, the data store S may exhibit a linear increase in ingestion time proportional to a difference between the expected data rate $R_E$ and the first rate R1. Accordingly, the data ingestion engine 120 may determine to introduce a stream buffer manager to monitor the resource usage at the data store S and use that information to dynamically control the rate at which data is fed to the data store S. As an alternative, the data ingestion engine 120 may introduce a data preprocessor configured to accelerate the data ingestion rate. For instance, if the data store S is a graph-based database management system, the preprocessor may create a compact version of the graph with no node duplication to improve the ingestion rate at the data store S.

The data ingestion engine 120 may, in another example scenario, encounter a data analysis plan having the following sequence of operations: create a first SQL query Q1 on a relational database management system D1, create a node set N1 and an edge set E1 based on the result R1 of the first SQL query Q1, store a graph G1=(N1, E1) in a graph-based database management system D2. To perform the operations in this analysis plan may require a mapping from the result R1 to the node set N1. Assume that the rest of the data analysis plan only uses the nodes N1 and the nodes' properties from the graph G1 but not the edges E1 from the graph G1. In this case, the data ingestion engine 120 may determine that despite the graph G1 being stored in the graph-based database management system D2, the capabilities that specific to the graph-based database management system D2 is not actually used to perform the operations in the data analysis plan. Thus, the nodes N1 may actually be constructed as a relational view on the relational database management system D1 itself without ever constructing the graph G1 and storing the graph G1 into the graph-based database management system D2. Accordingly, the data ingestion engine 120 may optimize the ingestion of data into the polystore 110 by at least replacing the graph construction operation in the data analysis plan with a different operation to create the relational view of the nodes N1, thereby eliminating the data transfer cost from the relational database management system D1 to the graph-based database management system D2.

The data ingestion engine 120 may encounter another example analysis plan having the following operations: a query Q retrieves data from a data source, constructs an intermediate data object O, performs a function f with the intermediate data object O as the input, and stores the result in a data store D. If the function f is an object-creating function that may be modeled as a Skolem function, the data ingestion engine 120 may be required to determine whether the function f should be computed incrementally (e.g., to avoid an accumulation of excess data) or as a blocking operation. If the function f is computed as a blocking function, the data object O may be assigned an identifier once and the result of computing the function f may be stored based on the identifier of the data object O. By contrast, to compute the function f incrementally may require multiple partial objects to be stored with temporary object identifiers. These partial objects may be temporarily locked and not made available until the final object is created. Thus, the data ingestion engine 120 may select an optimization strategy based on whether the data store D natively support the temporary locking.

As another example, the data ingestion engine 120 may attempt to optimize the ingestion of data into the polystore 110 when, for example, the first database management system 115a have comparable capability to one or more other database management systems in the polystore 110 such as, for example, the second database management system 115*b* and/or the third database management system 115*c*. In this case, the data ingestion engine 120 may choose between, for example, the first database management system 115*a* and the second database management system 115*b* based on the attributes of the incoming data as well as the exact capabilities of each database management system. For example, the first database management system 115*a* (e.g., an Apache Solr store) and the second database management system 115*b* (e.g., a PostgreSQL store) may both support full-text search. Nevertheless, the second database management system 115*b* may impose more stringent restrictions on the size of the individual text fields and the quantity of records that may be indexed. Thus, while the second database management system 115*b* (e.g., the PostgreSQL store) being associated with lower data transfer costs, storing the data in the first database management system 115*a* may realize greater scalability. Accordingly, the selection between the first database management system 115*a* and the second database management system 115*b* may be made based on a size of the incoming data provided, for example, by the results of the benchmarking performed by the data ingestion engine 120.

Figure 4:
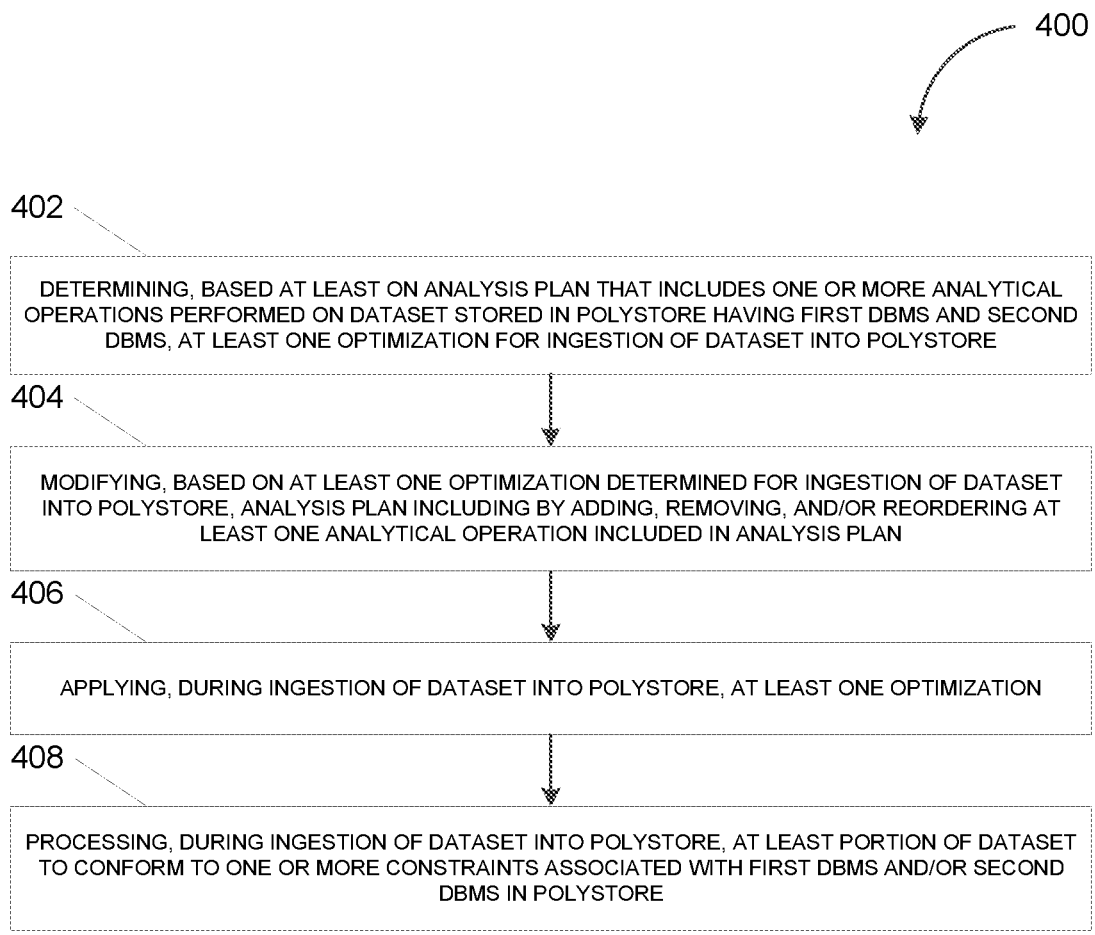
FIG. 4 depicts a flowchart illustrating a process for ingesting data into a polystore, in accordance with some example embodiments.

FIG. 4 depicts a flowchart illustrating a process 400 for ingesting data into the polystore 110, in accordance with some example embodiments. Referring to FIGS. 1-4, the process 400 may be performed by the data ingestion engine 120. For instance, in some example embodiments, the data ingestion engine 120 may perform the process 400 in order to ingest, into the polystore 110, at least a portion of the heterogeneous dataset 200 such that the heterogeneous dataset 200 may be stored in the polystore 110 in a manner that maximizes the speed and/or efficiency of subsequent retrievals, transfers, and/or manipulations required by the data analysis plan 300.

At 402, the data ingestion engine 120 may determine, based at least on a data analysis plan that includes one or more analytical operations performed on a dataset stored in a polystore having a first database management system and a second database management system, at least one optimization for the ingestion of the dataset into the polystore. For example, the data ingestion engine 120 may optimize, based at least on the data analysis plan 300, the ingestion of the heterogeneous dataset 200 into the polystore 110, which may include the first database management system 115*a*, the second database management system 115*b*, and the third database management system 115*c*.

In some example embodiments, the data ingestion engine 120 may optimize the ingestion of the heterogeneous dataset 200 by at least selecting the first database management system 115*a*, the second database management system 115*b*, and/or the third database management system 115*c* for storing at least a portion of the heterogeneous dataset 200. For example, the data ingestion engine 120 may determine to store at least a portion of the heterogeneous dataset 200 in the first database management system 115*a*, the second database management system 115*b*, and/or the third database management system 115*c* based at least on the data models present in the heterogeneous dataset 200 and the data models supported by each of the first database management system 115*a*, the second database management system 115*b*, and/or the third database management system 115*c*. Alternatively and/or additionally, the data ingestion engine 120 may determine to store at least a portion of the heterogeneous dataset 200 in the first database management system 115*a*, the second database management system 115*b*, and/or the third database management system 115*c* based at least on one or more constraints associated with each of the first database management system 115*a*, the second database management system 115*b*, and/or the third database management system 115*c*.

The constraints associated with the first database management system 115*a*, the second database management system 115*b*, and/or the third database management system 115*c* may include resource constraints and/or capability constraints that prevent at least the portion of the heterogeneous dataset 200 from being stored at one or more of the first database management system 115*a*, the second database management system 115*b*, and/or the third database management system 115*c*. Alternatively and/or additionally, these resource constraints and/or capability constraints may render at least one of the first database management system 115*a*, the second database management system 115*b*, and/or the third database management system 115*c* a more optimal location for storing at least the portion of the heterogeneous dataset 200 than the others. Accordingly, it should be appreciated that the selection of the first database management system 115*a*, the second database management system 115*b*, and/or the third database management system 115*c* for storing at least the portion of the heterogeneous dataset 200 may be made in order to maximize the speed and/or efficacy of subsequently performing the analytical operations included in the data analysis plan 300. As noted, performing the analytical operations included in the data analysis plan 300 may require retrieving, transferring, and/or manipulating at least the portion of the heterogeneous dataset 200 stored in the polystore 110, for example, at the first database management system 115*a*, the second database management system 115*b*, and/or the third database management system 115*c*.

Alternatively and/or additionally, the data ingestion engine 120 may optimize the ingestion of the heterogeneous dataset 200 into the polystore 110 by at least precomputing and storing, in the first database management system 115*a*, the second database management system 115*b*, and/or the third database management system 115*c*, at least a portion of the derived data required by the data analysis plan 300. For example, one or more analytical operations included in the data analysis plan 300 may operate on derived data generated based on at least a portion of the heterogeneous dataset 200. Accordingly, the data ingestion engine 120 may determine to optimize the ingestion of the heterogeneous dataset 200 by at least precomputing this derived data. Furthermore, the data ingestion engine 120 may determine to store, in the first database management system 115*a*, the second database management system 115*b*, and/or the third database management system 115*c*, the derived data. The derived data may be stored in the first database management system 115*a*, the second database management system 115*b*, and/or the third database management system 115*c* instead of and/or in addition to the original portion of the heterogeneous dataset 200.

At 404, the data ingestion engine 120 may modify, based the at least one optimization determined for the ingestion of the dataset into the polystore, the data analysis plan including by adding, removing, and/or reordering at least one analytical operation included in the data analysis plan. In some example embodiments, the data ingestion engine 120 may modify the data analysis plan 300 in order to further exploit the optimizations applied to the ingestion of the heterogeneous dataset 200 into the polystore 110. The analysis plan 300 may also be modified to remove bottlenecks and/or maximize parallelization. For example, the data analysis plan 300 may be modified by at least adding, removing, and/or reordering one or more of the analytical operations included in the data analysis plan 300.

For instance, when the data ingestion engine 120 determines to precompute at least the portion of the derived data required by the data analysis plan 300, the data ingestion engine 120 may also determine to remove, from the data analysis plan, the one or more analytical operations corresponding to the generation of the derived data. Moreover, in accordance with the derived data being stored in the first database management system 115a, the second database management system 115b, and/or the third database management system 115c, the data ingestion engine 120 may modify the data analysis plan 300, for example, by adding one or more analytical operations, to retrieve, transfer, and/or manipulate the derived data from the first database management system 115a, the second database management system 115b, and/or the third database management system 115c. These analytical operations to retrieve, transfer, and/or manipulate the derived data may replace the one or more analytical operations to generate the derived data.

At 406, the data ingestion engine 120 may apply, during the ingestion of the dataset into the polystore, the at least one optimization. In some example embodiments, the data ingestion engine 120 may apply the at least one optimization during the ingestion of the heterogeneous dataset 200 into the polystore 110. For example, the data ingestion engine 120 may apply the at least one optimization by at least routing, in accordance with the at least one optimization, at least the portion of the heterogeneous dataset 200 for storage at the first database management system 115a, the second database management system 115b, and/or the third database management system 115c. Alternatively and/or additionally, the data ingestion engine 120 may apply the at least one optimization by at least precomputing and storing, in the first database management system 115a, the second database management system 115b, and/or the third database management system 115c, at least a portion of the derived data generated based on the heterogeneous dataset 200.

At 408, the data ingestion engine 120 may process, during the ingestion of the dataset into the polystore, at least a portion of the dataset to conform to one or more constraints associated with the first database management system and/or the second database management system in the polystore. As noted, the first database management system 115a, the second database management system 115b, and/or the third database management system 115c may be associated with one or more constraints. For example, the first database management system 115a, the second database management system 115b, and/or the third database management system 115c may be capable of ingesting the heterogeneous dataset 200 at limited rates. The first database management system 115a, the second database management system 115b, and/or the third database management system 115c may be capable of ingesting chunks of the heterogeneous dataset 200 in a threshold quantity and/or having a threshold size.

As such, in some example embodiments, the data ingestion engine 120 may be configured to buffer, during the ingestion of the heterogeneous dataset 200, at least a portion of the heterogeneous dataset 200 if the rate at which the heterogeneous dataset 200 is being output from the first data source 140a, the second data source 140b, and/or the third data source 140c exceeds the rate at which the first database management system 115a, the second database management system 115b, and/or the third database management system 115c are able to ingest the heterogeneous dataset 200. Alternatively and/or additionally, the data ingestion engine 120 may process at least the portion of the heterogeneous dataset 200 to conform to the size constraint and/or the quantity constraint associated with the first database management system 115a, the second database management system 115b, and/or the third database management system 115c. For instance, the data ingestion engine 120 may combine and/or partition chunks data that fail to meet the size constraint and/or quantity constraint at the first database management system 115a, the second database management system 115b, and/or the third database management system 115c to ensure that the heterogeneous dataset 200 may be successfully ingested into the polystore 110, for example, for storage at the first database management system 115a, the second database management system 115b, and/or the third database management system 115c.

Figure 5:
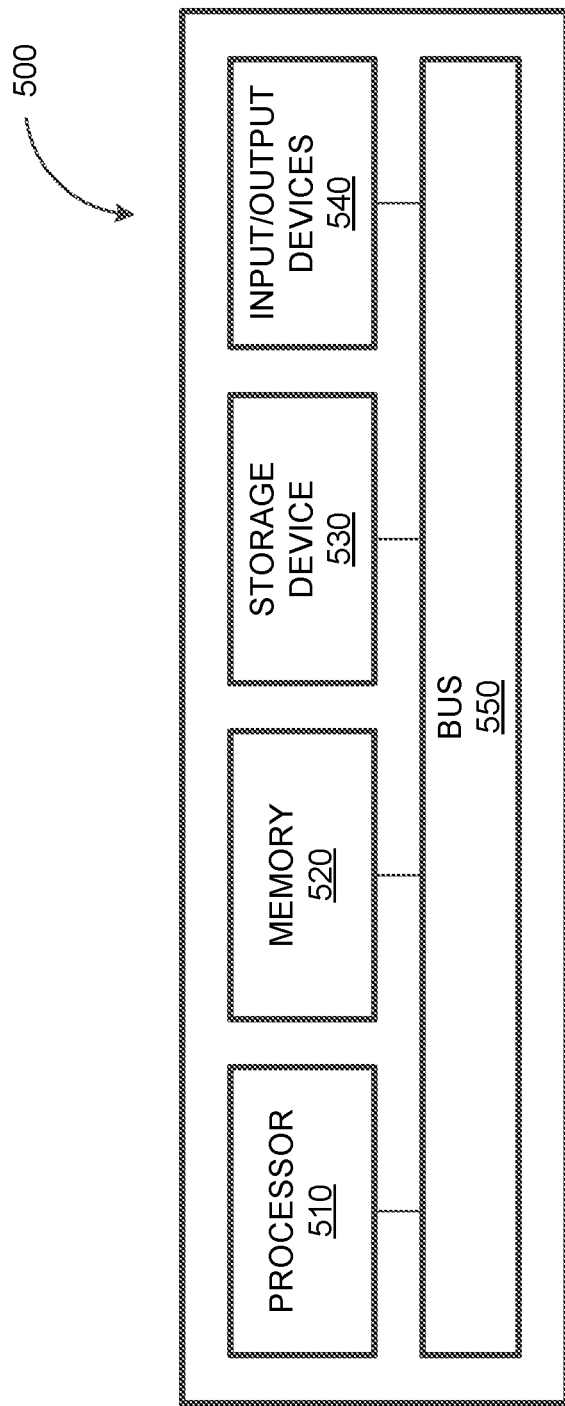
FIG. 5 depicts a block diagram illustrating a computing system, in accordance with some example embodiments.

FIG. 5 depicts a block diagram illustrating a computing system 500 consistent with implementations of the current subject matter. Referring to FIGS. 1 and 5, the computing system 500 can be used to implement the data ingestion engine 120 and/or any components therein.

As shown in FIG. 5, the computing system 500 can include a processor 510, a memory 520, a storage device 530, and input/output device 540. The processor 510, the memory 520, the storage device 530, and the input/output device 540 can be interconnected via a system bus 550. The processor 510 is capable of processing instructions for execution within the computing system 500. Such executed instructions can implement one or more components of, for example, the data ingestion engine 120. In some example embodiments, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object database management systems, for example. The storage device 530 is capable of providing persistent storage for the computing system 500. The storage device 530 can be a floppy disk device, a hard disk device, an optical disk device, a solid-state device, a tape device, and/or any other suitable persistent storage means. The input/output device 540 provides input/output operations for the computing system 500. In some example embodiments, the input/output device 540 includes a keyboard and/or pointing device. In various implementations, the input/output device 540 includes a display unit for displaying graphical user interfaces.

According to some example embodiments, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and
   at least one memory storing instructions which, when executed by the at least one data processor, result in operations comprising:
   determining, based at least on a data analysis plan, at least one optimization for an ingestion of a dataset into a polystore that includes a first database management system and a second database management system having a different data model, the data analysis plan including one or more analytical operations performed on at least a portion of the dataset being ingested into the polystore and/or stored in the polystore, and the ingestion of the dataset into the polystore including storing, in the first database management system and the second database management system, at least the portion of the dataset;
   modifying, based on the at least one optimization determined for the ingestion of the dataset into the polystore, the data analysis plan, the data analysis plan being modified by at least adding, removing, transforming, and/or reordering the one or more analytical operations included in the data analysis plan;

processing at least the portion of the dataset to conform to a constraint associated with the first database management system and/or the second database management system; and applying, during the ingestion of dataset into the polystore, the at least one optimization by at least routing, based on the at least one optimization, at least the processed portion of the dataset for storage at the first database management system and/or the second database management system.

2. The system of claim 1, wherein the processing includes transforming, combining, or partitioning chunks of data from the dataset in response to the chunks of data failing to meet a size constraint and/or a quantity constraint associated with the first database management system and/or the second database management system.

3. The system of claim 1, wherein the processing includes buffering at least the portion of the dataset in response to the portion of the dataset being output from one or more data sources at a rate that exceeds an ingestion rate of the first database management system and/or the second database management system.

4. The system of claim 1, wherein the at least one optimization include storing at least the portion of the dataset at the first database management system and not the second database management system.

5. The system of claim 1, wherein the at least one optimization includes precomputing, based on at least the portion of the dataset, derived data, and wherein the at least one optimization further includes storing the derived data at the first database management system and/or the second database management system.

6. The system of claim 5, wherein the derived data is generated by performing a first analytical operation in the data analysis plan, and wherein the data analysis plan is modified by at least removing, from the data analysis plan, the first analytical operation.

7. The system of claim 6, wherein the data analysis plan is further modified by at least adding, to the data analysis plan, a second analytical operation to retrieve, from the first database management system and/or the second database management system, at least a portion of the derived data.

8. The system of claim 1, wherein the at least one optimization is determined based on a data model associated with the first database management system and/or the second database management system.

9. The system of claim 8, wherein the at least on optimization includes storing at least the portion of the dataset in the first database management system and/or the second database management system based at least on the portion of the dataset having a same data model as the first database management system and/or the second database management system.

10. The system of claim 1, wherein the at least one optimization is determined based at least on a rate at which the first database management system and/or the second database management system is able to ingest the dataset.

11. The system of claim 1, wherein the at least one optimization is determined based at least on the first database management system and/or the second database management system supporting a first analytical operation but not a second analytical operation in the data analysis plan.

12. The system of claim 1, wherein the at least one optimization is determined based at least on a computational or system-level resource that is available at the first database management system and/or the second database management system for performing the one or more analytical operations in the data analysis plan.

13. A computer-implemented method, comprising:

determining, based at least on a data analysis plan, at least one optimization for an ingestion of a dataset into a polystore that includes a first database management system and a second database management system, the data analysis plan including one or more analytical operations performed on at least a portion of the dataset being ingested into the polystore and/or stored in the polystore, and the ingestion of the dataset into the polystore including storing, in the first database management system and the second database management system, at least the portion of the dataset;

modifying, based on the at least one optimization determined for the ingestion of the dataset into the polystore, the data analysis plan, the data analysis plan being modified by at least adding, removing, transforming, and/or reordering the one or more analytical operations included in the data analysis plan;

processing at least the portion of the dataset to conform to a constraint associated with the first database management system and/or the second database management system; and applying, during the ingestion of dataset into the polystore, the at least one optimization by at least routing, based on the at least one optimization, at least the processed portion of the dataset for storage at the first database management system and/or the second database management system.

14. The method of claim 13, wherein the at least one optimization include storing at least the portion of the dataset at the first database management system and not the second database management system.

15. The method of claim 13, wherein the at least one optimization includes precomputing, based on at least the portion of the dataset, derived data, and wherein the at least one optimization further includes storing the derived data at the first database management system and/or the second database management system.

16. The method of claim 15, wherein the derived data is generated by performing a first analytical operation in the data analysis plan, and wherein the data analysis plan is modified by at least removing, from the data analysis plan, the first analytical operation.

17. The method of claim 16, wherein the data analysis plan is further modified by at least adding, to the data analysis plan, a second analytical operation to retrieve, from the first database management system and/or the second database management system, at least a portion of the derived data.

18. The method of claim 13, wherein the at least on optimization includes storing at least the portion of the dataset in the first database management system and/or the second database management system based at least on the portion of the dataset having a same data model as the first database management system and/or the second database management system.

19. A non-transitory computer-readable medium storing instructions, which when executed by at least one data processor, result in operations comprising:

determining, based at least on a data analysis plan, at least one optimization for an ingestion of a dataset into a polystore that includes a first database management system and a second database management system, the data analysis plan including one or more analytical operations performed on at least a portion of the dataset being ingested into the polystore and/or stored in the polystore, and the ingestion of the dataset into the polystore including storing, in the first database management system and the second database management system, at least the portion of the dataset;

modifying, based on the at least one optimization determined for the ingestion of the dataset into the polystore, the data analysis plan, the data analysis plan being modified by at least adding, removing, transforming, and/or reordering the one or more analytical operations included in the data analysis plan;

processing at least the portion of the dataset to conform to a constraint associated with the first database management system and/or the second database management system; and applying, during the ingestion of dataset into the polystore, the at least one optimization by at least routing, based on the at least one optimization, at least the processed portion of the dataset for storage at the first database management system and/or the second database management system.

* * * * *